United States Patent
Schuessler et al.

(10) Patent No.: US 11,121,424 B2
(45) Date of Patent: Sep. 14, 2021

(54) METHOD FOR ARRANGING AT LEAST ONE PART OF A BATTERY HOUSING AND ARRANGEMENT DEVICE

(71) Applicant: AUDI AG, Ingolstadt (DE)

(72) Inventors: Martin Schuessler, Koesching (DE); Steffen Walter, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 155 days.

(21) Appl. No.: 16/550,540

(22) Filed: Aug. 26, 2019

(65) Prior Publication Data
US 2020/0099017 A1 Mar. 26, 2020

(30) Foreign Application Priority Data
Sep. 21, 2018 (DE) ...................... 10 2018 216 113.5

(51) Int. Cl.
*H01M 50/10* (2021.01)
*H01M 10/613* (2014.01)
(Continued)

(52) U.S. Cl.
CPC ....... *H01M 50/10* (2021.01); *H01M 10/0404* (2013.01); *H01M 10/0481* (2013.01);
(Continued)

(58) Field of Classification Search
CPC ........... H01M 10/0481; H01M 10/613; H01M 10/6556; H01M 10/049; H01M 10/0404;
(Continued)

(56) References Cited

U.S. PATENT DOCUMENTS

2012/0301772 A1* 11/2012 Hirsch ................ H01M 10/613
429/120
2018/0198100 A1* 7/2018 Blaha .................... H01M 50/20

FOREIGN PATENT DOCUMENTS

DE 10 2009 058 070 A1 6/2011
DE 10 2010 038 600 A1 2/2012
(Continued)

OTHER PUBLICATIONS

English Translation of De102010038600, Publication Date Feb. 2, 2012, Bayerische Motoren Werke Aktiengesellschaft, https://patentscope.wipo.int/search/en/detail.jsf?docId=DE104967921&tab=NATIONALBIBLIO (Year: 2012).*

(Continued)

*Primary Examiner* — Maria Laios
*Assistant Examiner* — Adam J Francis
(74) *Attorney, Agent, or Firm* — Maier & Maier, PLLC (57) ABSTRACT

A method for arranging at least one battery module and at least one part of a battery housing having a cooling device, which is arranged on a side of the part of the battery housing and which has a predetermined module placement area. In doing so, a thermally conductive component is placed on the cooling device, at least in the predetermined module placement area, and the at least one battery module is inserted in the module placement area and pressed against the thermally conductive component in a pressing direction (R) extending in the direction of the cooling device. Before the pressing, a counter-holder device is arranged on the cooling device, which supports the cooling device during pressing of the at least one battery module in the predetermined module placement area, opposite the pressing direction (R).

20 Claims, 3 Drawing Sheets

(51) Int. Cl.
    *H01M 10/04*     (2006.01)
    *H01M 50/20*     (2021.01)
    *H01M 50/409*    (2021.01)

(52) U.S. Cl.
    CPC ......... *H01M 10/613* (2015.04); *H01M 50/20* (2021.01); *H01M 50/409* (2021.01)

(58) Field of Classification Search
    CPC .... H01M 50/10; H01M 50/409; H01M 50/20; H01M 10/0409
    See application file for complete search history.

(56) References Cited

FOREIGN PATENT DOCUMENTS

| DE | 102010038600 | A1 | * | 2/2012 | ........ H01M 10/6556 |
|---|---|---|---|---|---|
| DE | 10 2011 052 513 | A1 | | 2/2013 | |
| DE | 10 2012 214 443 | A1 | | 2/2014 | |
| DE | 10 2013 207 535 | A1 | | 10/2014 | |
| DE | 10 2016 201 726 | A1 | | 8/2017 | |
| DE | 102016201726 | A1 | * | 8/2017 | .......... H01M 10/613 |
| DE | 10 2016 216 050 | A1 | | 3/2018 | |

OTHER PUBLICATIONS

English Translation of DE102016201726—Battery Arrangement, Publication Date Aug. 10, 2017; Applicant Mahle international GmbH https://patentscope.wipo.int/search/en/detail.jsf?docId=DE202570622&tab=NATIONALBIBLIO&_cid=P21-KMF1MS-53855-1 (Year: 2017).*

Examination Report dated Jun. 14, 2019, in corresponding German application No. 10 2018 216 113.5; 18 pages.

Extended European Search Report dated Mar. 30, 2020, including the European Search Report and the European Search Opinion, in connection with corresponding EP Application No. 19188817.1 (10 pgs., including machine-generated English translation).

* cited by examiner

METHOD FOR ARRANGING AT LEAST ONE PART OF A BATTERY HOUSING AND ARRANGEMENT DEVICE

FIELD

The disclosure relates to a method for arranging at least one battery module in at least one part of a battery housing, for example a lower part, with a cooling device. In doing so, initially a part of the battery housing is provided, which has an insertion opening for inserting the at least one battery module, as well as the cooling device, which is arranged on a side of the battery housing opposite the insertion opening. The cooling device in this case has a first side facing the insertion opening and a predetermined module placement area. Furthermore, a thermally conductive component is placed on the first side of the cooling device, at least in the predetermined module placement area, and the at least one battery module is inserted in the module placement area. The battery module is then pressed in a pressing direction extending in the direction of the cooling device. The invention also includes an arrangement device for arranging at least one battery module in at least one part of a battery housing having a cooling device.

BACKGROUND

It is known from the prior art to press battery modules onto a thermally conductive component, for example a layer of thermally conductive component, also called gap filler, for thermal connection during installation into a battery housing. A part of the battery housing, for example the base, may be provided, for example, by a cooling device. By means of the thermally conductive component, thermally insulated air pockets between the partially uneven module housing base and the cooling device are closed, whereby thermal dissipation from the battery module to the cooling device is improved.

The use of such a thermally conductive paste for improved thermal connection of a battery module to a cooling device is described, for example, in DE 10 2013 207 535 A1. Furthermore, DE 10 2012 214 443 A1 describes the use of a plastic matrix made of a foamed material within a battery cell between the chemical carrier and the cell housing. However, this foamed material is intended rather to distribute the pressure, which is caused by the tensioning of the battery cell, evenly on the chemical carrier. Furthermore, DE 10 2011 052 513 A1 describes a housing part for mounting a traction battery of an electric vehicle, which is pressed from multiple sheets, between which a gap-filling thermally conductive material is placed.

With a configuration as described at the beginning, in which a battery module is intended to be pressed onto a gap filler bed, which is located between the battery module and the housing base, formed for example by a cooling device, there is the problem, however, that the forces resulting in this process, which act upon both the module and/or the battery cells as well as the battery housing, can lead to elastic or plastic deformation, which, in turn, is undesirable. This is especially caused in that the conventional thermally conductive pastes and/or gap fillers are relatively viscous, whereby very large forces must be used for even distribution of such a thermally conductive paste by means of the pressing of the battery module. A correspondingly shape-stable formation of the battery housing and/or of the battery modules disadvantageously leads, however, to an increased material expense, to more installation space needed, and especially to more weight, which should be kept as low as possible specifically in connection with high-voltage batteries for electric or hybrid vehicles for increasing the range. In order to achieve sufficiently good distribution of the thermally conductive paste and correspondingly also with low press-on forces when pressing the battery modules, a larger quantity of this thermally conductive paste would have to be provided, which, in turn, causes disadvantages with respect to an increased weight and costs and additionally negatively impacts the thermal conductivity from the battery module to the cooling device. This also applies equivalently or similarly to other, particularly not pasty, thermally conductive components.

SUMMARY

Thus, the object of the present invention is to provide a method for arranging at least one battery module in at least one part of a battery housing having a cooling device, as well as an arrangement device, which enables the most efficient arrangement of a battery module possible in the battery housing and the most efficient connection of the battery module to the cooling device possible by means of the thermally conductive component.

With a method according to the invention for arranging at least one battery module in at least one part of a battery housing, such as, for example, a lower part of the battery housing, with a cooling device, initially the at least one part of the battery housing is provided, which has an insertion opening for inserting the at least one battery module, as well as the cooling device, which is arranged on a side of the part of the battery housing opposite the insertion opening. The cooling device in this case may form, for example, a side of the battery housing such as, for example, the base. Furthermore, the cooling device has a first side facing the insertion opening and a predetermined module placement area. In addition, a thermally conductive component, for example a thermally conductive paste, which can also be characterized as a gap filler, can be placed onto the first side of the cooling device, at least in the predetermined module placement area, and the at least one battery module inserted in the module placement area. In this process, the thermally conductive component may be placed first, for example, and subsequently the at least one battery module can be placed onto the thermally conductive component or the at least one battery module may also be inserted first and subsequently the thermally conductive component can be placed, for example injected. Furthermore, the battery module is then pressed onto the thermally conductive component, in a pressing direction extending in the direction of the cooling device. Moreover, at least before the pressing of the battery module, a counter-holder device is arranged on a second side opposite the first side of the cooling device and second side facing away from the insertion opening, said second side supporting the cooling device during pressing of the at least one battery module in the predetermined module placement area.

Due to the support of the cooling device, particularly opposite the pressing direction, by means of the counter-holder device during pressing of the at least one battery module, a curvature of the cooling device can be advantageously prevented in the module placement area in the pressing direction. Such a curvature can be prevented even with a relatively thin formation of such a cooling device, for example as a cooling plate. Enormous advantages can thereby be achieved by the invention. As mentioned, the support of the cooling device enables a significantly thinner formation of such a cooling device, whereby significant weight and costs can be spared. However, the battery module can be pressed onto the thermally conductive component and onto the cooling device with a very high pressing force without this leading to a curvature of the cooling device in the pressing direction. Preventing such a curvature makes it possible, in turn, for the thermally conductive component to be distributed homogenously over the entire module placement area, onto which the battery module is placed, by means of pressing of the battery module. The homogeneity of the thermally conductive component, i.e. its equally thick and/or equally high distribution over the module placement area and beyond, enables, in turn, an especially homogenous dissipation of heat, which is especially relevant for efficient cooling of the battery modules. Due to the possibility of using a high press-on force, the quantity of required thermally conductive component can simultaneously be kept very low. After the pressing of the battery module, a very thin thermally conductive component layer results between the lower side of the battery module and the cooling device. Even though the thermally conductive component has very good thermal conductivity, particularly thermal conductivity that is greater than that of air, particularly significantly greater, the thermal conductivity of such a thermally conductive component is still less than that of metal, for example aluminum, such that it is still desirable to keep the layer of thermally conductive component as thin as possible in order to optimize the dissipation of heat from the battery module to the cooling device, which preferably has a metallic material, for example aluminum. Correspondingly, the dissipation of heat can be designed especially efficiently due to the measures according to the invention. In addition, the low quantity of thermally conductive component also represents significant cost savings as well as, in turn, a weight reduction. In addition, a negative impact or damage to the cooling device can be prevented by preventing the curvature in the pressing direction by means of the counterholder device. As a whole, a battery module can be arranged in a battery housing and/or battery housing part in an especially efficient manner and the efficiency of module cooling can be increased enormously due to the described arrangement method.

The thermally conductive component in this case may be, for example, a thermally conductive paste, a gap filler, a gap pad, a thermally conductive adhesive, or the like and generally may be any form and type of a material for thermal connection.

As previously mentioned, the part of the battery housing may be, for example, a lower part of the battery housing. After installation of the at least one battery module for example, a corresponding housing cover can be placed on said housing part. Such a battery housing may be formed largely, for example except for the cooling device, as an extruded structure, for example as an aluminum extruded structure.

Furthermore, the battery housing can be formed for accommodating multiple battery modules. A battery module in this case comprises at least a battery cell, for example a lithium-ion battery cell, preferably however multiple such battery cells. If the battery housing is formed to accommodate multiple battery modules, it also correspondingly has multiple module placement areas. For example, the battery housing can be divided into multiple placement areas for the respective battery modules, which may also be separated from one another, for example, by means of walls or struts extending vertically with respect to the cooling device, at least in areas. The cooling device, which may be formed, for example, as a cooling plate, may be arranged, for example, on the lower side on the extruded structure and/or generally on the remaining part of the battery housing, for example be welded or bolted or attached in some other manner. The cooling device in this case may provide multiple module placement areas for the respective battery modules. Accordingly, a thermally conductive component may be placed onto a respective module placement area, on which subsequently the respective battery modules are inserted or placed and pressed as described. In this case as well, the battery modules may be arranged, in turn, in the particular module placement areas first and subsequently the thermally conductive component be placed into the respective module placement areas, for example injected.

The counter-holder device is arranged, at least before the pressing of the at least one battery module, on the lower side of the cooling device. This can take place, for example, in that the part of the battery housing, into which the at least one battery module is intended to be inserted, is placed onto the counter-holder device. In particular, the counter-holder device can be attached to the lower side of the cooling device, even before insertion of the at least one battery module and particularly even before the placement of the thermally conductive component, in order to support the cooling device during pressing of the at least one battery module.

As previously described, the cooling device is preferably formed as a cooling plate. In this case, it is provided according to a further advantageous design of the invention, that the cooling device is formed as a cooling plate with cooling channels, wherein the cooling channels are separated from one another, at least in areas, by means of intermediate areas of the cooling plate, through which none of the cooling channels extend. In order to cool the at least one battery module, a coolant and/or cooling medium, which may be liquid and/or gas, advantageously may flow through such cooling channels. This enables an especially efficient cooling of the battery modules. By means of the invention and its embodiments, it is then advantageously possible to form such a cooling plate with cooling channels in an especially simple and weight-saving manner. Such a cooling plate with cooling channels may be provided, for example, by two sheets, particularly aluminum sheets, which are connected to one another in the intermediate areas in order to form cooling channels, pressed for example, for example by means of a roll bonding process, or welding, or the like. Such sheets may be formed with especially thin walls, because they do not have to be particularly dimensionally stable due to the counter-holder device itself, in order to prevent a curvature in the pressing direction during pressing.

In order to prevent the cooling channels from being pressed together during pressing of the at least one battery module, it is especially advantageous when the counter-holder device has at least one support element, which makes contact with the second side of the cooling device in order to provide support only in at least one of the intermediate areas of the cooling plate. In other words, the counter-holder device can be designed such that it only supports the cooling plate in the intermediate areas between the cooling channels. It can thereby advantageously be achieved that the press-on forces can be introduced largely over the intermediate areas of the cooling plate into the support elements of the counter-holder device, whereby the forces acting on the cooling channels themselves can be reduced.

In addition, it may be provided in this case that the counter-holder device, particularly the support element itself, is formed rigidly. It may also be provided that the counterholder device is formed with a type of air-bellows system or at least partially with a deformable, particularly elastically deformable, contact surface, which makes contact over a large surface area of the cooling device on the lower side, that is not only in the intermediate areas between the cooling channels. For example, the counter-holder device can be designed such that its contact surface deforms the cooling device under the action of the press-on force acting in the pressing direction during pressing of the at least one battery module, at least in areas, in adaptation to the bottom-side shaping Such deformable properties, particularly elastically deformable properties, can be implemented, for example, by means of a pneumatic system, such as the previously mentioned air bellows system, a hydraulic system, and/or a hydropneumatic system as a part of the counter-holder device. Also the contact surface of the counter-holder device can be formed as a type of elastic membrane, for example made of an elastomer or rubber. The support element of the counter-holder device may also be formed, for example, completely from an elastically deformable solid body such as, for example, rubber. Thus, there are numerous advantageous options available for forming the counter-holder device.

Furthermore, it is preferable that the counter-holder device, even in the event that it has multiple support elements for large-surface support of the cooling plate and/or of the cooling device, these support elements, respectively centered, support the respective module placement area of the cooling plate opposite the pressing direction.

With a further especially advantageous embodiment of the invention, at least a part of the counter-holder device is formed so as to move in the pressing direction and is moved in the pressing direction during pressing of the at least one battery module. This can also be implemented with a formation of the counter-holder device with rigid support elements as well as with deformable, especially elastically deformable, support elements. The flow behavior and thus the distribution of the thermally conductive component can be controlled and influenced significantly better by means of such a moving and/or movable formation of the counter-holder device.

In doing so, it is further advantageous when a counter-force, in the module placement area, acting opposite the pressing direction is applied to the cooling device by means of the counter-holder device before pressing of the at least one battery module, such that the cooling device in the module placement area has a curvature opposite the pressing direction before the pressing. In other words, the counter-holder device presses a battery module against the lower side of the cooling device before the pressing of the at least one battery module, especially in the respective module placement areas, such that the cooling device in the respective module placement areas is curved or sagging toward the inside, that is in the direction of the insertion opening. Such a curvature means that, at the start of the pressing of the at least one battery module in the central area of the module placement area, in which the curvature is the greatest, also the pressing forces are the greatest in the pressing direction. This means that the thermally conductive component initially placed primarily in the central area is pressed outward especially efficiently and thus distributed especially evenly over the entire module placement area.

During pressing of the at least one battery module, the at least one part of the counterholder device can be advantageously moved in the pressing direction until the cooling device is aligned in a planar fashion in the module placement area. In other words, the curvature that exists opposite the pressing direction at the start can be increasingly reduced by pressing of the at least one battery module, on one hand, and by moving the at least one part of the counter-holder device in the pressing direction, on the other hand, until finally the cooling device is aligned in the module placement area, particularly in a planar fashion as a whole. An especially efficient and homogenous distribution of the thermally conductive component can be achieved in this manner.

Moreover, the part of the battery housing may have restrictive elements extending in the pressing direction and restricting the predetermined module placement area vertically with respect to the pressing direction, said restrictive elements being mounted on the cooling device. Such restrictive elements may be provided, for example, by crossbars, which separate the individual module areas from one another, for example as a type of wall or intermediate wall between battery modules. Such restrictive elements may likewise be part of the previously described extruded structures, with which the battery housing may be formed. The cooling plate may then be attached on the lower side to said restrictive elements, for example be welded to them or bolted or attached in some other manner. The large part of the press-on forces then acts accordingly on the parts of the cooling device located between said restrictive elements. Accordingly, it is advantageous when the counter-holder device is designed such that it supports the cooling device, specifically in the area between these restrictive elements. A sagging or curving of the cooling device between the restrictive elements in the pressing direction can thus advantageously be prevented. Simultaneously, the restrictive elements may also be used as stop elements as will be described in greater detail in the following.

With a further advantageous embodiment of the invention, the at least one battery module has a module housing, on which a flange is arranged on at least two opposite sides, wherein the pressing of the battery module takes place by means of a pressing tool, which exerts a press-on force onto the flange in the pressing direction. In this manner, especially suitable points of application for the pressing forces can be provided, which prevent an overload on the module itself, whereby an elastic or plastic deformation of the battery modules themselves can advantageously be avoided. In doing so, such a flange may not only be arranged at two opposite sides of such a module housing but rather also completely enclose the module housing, for example. The required pressing forces can be especially advantageously thereby distributed to the largest possible application surface on the module housing. At least one battery cell, preferably also multiple battery cells, is accommodated in the module housing.

Furthermore, it is advantageous when the battery module is moved in the pressing direction during pressing until a side of the flange facing the cooling device is resting on the restrictive elements. Thus, the restrictive elements can simultaneously also be used as stop elements, which restrict the movement of the battery module in the pressing direction and determine the endpoint of movement. At this point, the battery modules can then advantageously also be bolted to the battery housing via their module housing or attached thereto in some other manner.

After the pressing of the battery modules, the counter-holder device is removed and the remaining assembly steps can be implemented, for example placement of a housing cover and mounting of the battery housing with the inserted battery modules on an underbody protection element or other or further assembly steps. The battery ultimately thus provided, particularly high-voltage battery, can then be mounted in the motor vehicle, preferably in the underbody area of the motor vehicle.

Accordingly, a battery arrangement provided by means of the method according to the invention or one of its embodiments should be considered as part of the invention as well as a motor vehicle having such a battery arrangement also.

Furthermore, the invention also relates to an arrangement device for arranging at least one battery module in at least one part of a battery housing having a cooling device, wherein the arrangement device is designed to press at least one battery module, in a state arranged in a predetermined module placement area of the cooling device, onto a thermally conductive component in a pressing direction extending in the direction of the cooling device. Furthermore, the arrangement device has a counter-holder device, which is designed to support the cooling device during pressing of the at least one battery module, in a predetermined module placement area, opposite the pressing direction, in a state arranged on one side of the cooling device.

The advantages listed for the method according to the invention and its embodiments apply in a similar manner to the arrangement device according to the invention. Moreover, the method steps described in connection with the method according to the invention and its embodiments enable the further development of the arrangement device according to the invention by means of further corresponding objective features.

The invention also comprises the combinations of the features of the described embodiments.

BRIEF DESCRIPTION OF THE FIGURES

Exemplary embodiments of the invention are described in the following. The following is shown.

DETAILED DESCRIPTION

The exemplary embodiments explained in the following refer to preferred embodiments of the invention. With the exemplary embodiments, the described components of the embodiments represent individual features to be considered independently of one another, which also further embody the invention independently of one another. Thus, the disclosure should also comprise combinations of the features of the embodiments other than those shown. Furthermore, the described embodiments can also be supplemented through further described features of the invention.

The same reference numerals refer to equivalent features and functions in the figures.

Figure 1:
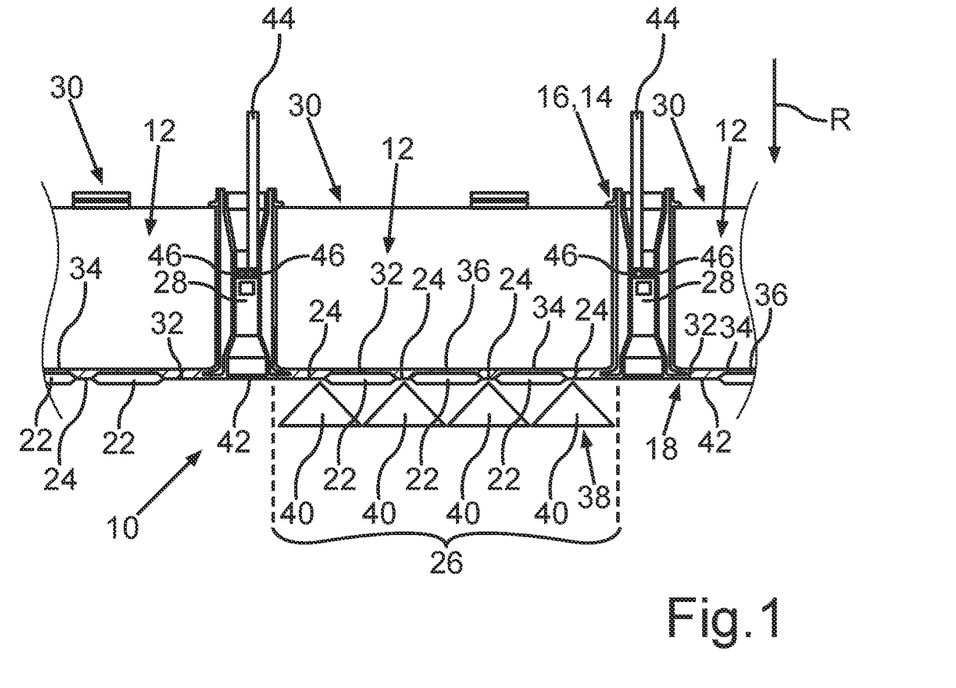
FIG. 1 a schematic representation of an arrangement device for arranging a battery module in at least one part of a battery housing having a cooling device, according to an exemplary embodiment of the invention.
Figure 2:
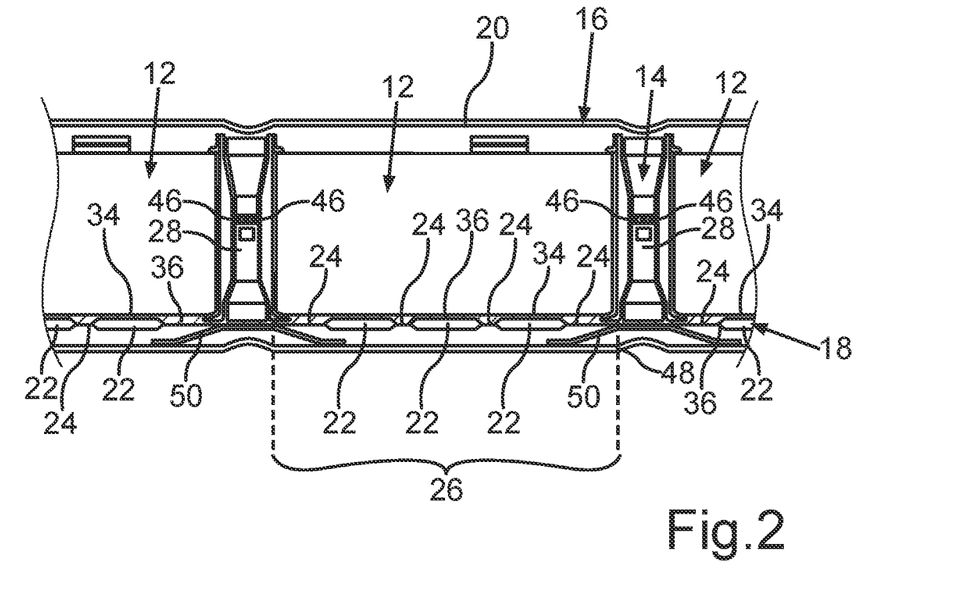
FIG. 2 a schematic representation of the battery module arranged in the battery housing by means of a method according to an exemplary embodiment of the invention.

FIG. 1 shows a schematic representation of an arrangement device 10 according to an exemplary embodiment of the invention. It is used to arrange a battery module 12 in at least one part 14 of a battery housing 16 having a cooling device 18. In addition to the lower part 14 shown in FIG. 1, the battery housing 16 may also have a suitable cover 20, which is shown in FIG. 2. As shown in FIG. 1, the battery housing 16 may be designed for mounting multiple battery modules 12. The cooling device 18, which is formed in this example as a cooling plate with cooling channels 22 and intermediate areas 24 located between the cooling channels 22, with said intermediate areas separating the cooling channels 22 from one another, forms the base of the battery housing 16 in this example. For mounting or placing the respective battery modules 12, the cooling device 18 has respective, assigned module placement areas 26. The respective module placement areas 26, of which only one has been provided with a reference numeral as an example here, are separated from one another by means of crossbars 28. These crossbars 28 extend perpendicular to the cooling device 18 in this case. In order to insert the battery modules 12 into the battery housing 16, the battery housing 16, particularly the lower part 14 thereof, has respective insertion openings 30. After assembly of the battery modules 12 in the battery housing lower part 14, these insertion openings 30 can be closed by means of the cover 20 of the battery housing 16.

The battery housing 16 may be at least partially formed as an aluminum extruded structure. In order to provide a best-possible thermal connection of the respective battery modules 12 with the cooling device 18, a thermally conductive component 36, for example a thermally conductive paste and/or gap filler, is located in the respective module placement areas 26 between a first side 32 of the cooling device 18, which is facing the insertion openings 30, and the lower side 34 of the respective battery modules 12. Such a thermally conductive component 36 should optimally be arranged as the thinnest layer possible with the most constant height possible between the battery modules 12 and the cooling device 18. In order to achieve such a thin layer, very high press-on forces are necessary for pressing the battery modules 12 onto said thermally conductive component 36 in the respective module placement areas 26, said forces being in a range of 25 N/cm$^2$ for example. In order to simultaneously enable a homogenous distribution of this thermally conductive component 36, a bending of the cooling device in the central areas of the respective module placement areas 26 must also be prevented. Simultaneously, it is advantageous when the cooling device 18 can be formed to be as light as possible, i.e. with low weight.

This is then advantageously enabled by means of the arrangement device 10. This device has a counter-holder device 38. This counter-holder device 38 comprises, in turn, multiple support elements 40 in this example, which support the cooling device 18 on a second side 42, which is opposite the first side 32 and is facing away from the respective insertion openings 30. The battery modules 12 can thereby be especially efficiently arranged in the battery housing 16. For this purpose, a predetermined quantity of thermally conductive component 36 can thus initially be placed in the respective module placement areas 26, particularly on the first side 32 of the cooling device 18. Subsequently, the respective battery modules 12 can be placed on the respective module placement areas 26, particularly on the thermally conductive component 36. Alternatively, the respective battery module 12 can be inserted first and then the thermally conductive component 36 can be injection molded, particularly between the battery module 12 and the cooling device 18. Subsequently, the battery modules 12 are pressed against the thermally conductive component 36 and particularly against the cooling device 18 in a pressing direction R extending in the direction of the cooling device 18. During this pressing, the provision of a counter-force, i.e. opposite the pressing direction R, is then advantageously possible by means of the counter-holder device 38, such that a curvature of the cooling device 18 in the module placement area 26 is prevented in the pressing direction R.

Furthermore, the support elements 40 in this example are arranged such that they only make contact with the cooling device 18 in the intermediate areas 24 for support purposes. The press-on force effective in the pressing direction R can thereby advantageously be introduced into the respective support elements 40 by means of these intermediate areas 24. The pressure on the walls of the cooling channels 22 is reduced accordingly. This enables, in turn, a thin-walled and thus lighter formation of the cooling device 18 in terms of weight, without having to accept the risk of a possible elastic or plastic deformation in the area of the cooling channels 22.

For pressing of the battery modules 12, the arrangement device 10 further has a pressing tool 44, by means of which the press-on force directed in the pressing direction R is exerted onto the battery modules 12. In order to also prevent a deformation or damage to the battery modules 12 themselves during pressing of the battery modules 12, it is furthermore especially advantageous when the housing of these battery modules 12 has a flange 46, onto which the press-on force is applied for pressing the battery modules 12 by means of the pressing tool 44, at least on two opposite sides, and preferably all the way around.

Once the battery modules 12 have been arranged in the battery housing 16, particularly in the lower part 14 thereof, in the described manner, the arrangement device 10 can be removed and/or the battery housing part 14 with the battery modules 12 can be removed from the arrangement device 10, and subsequent assembly steps for providing the final battery arrangement, particularly of a high-voltage battery, can be implemented. This battery arrangement is shown schematically in FIG. 2. The individual battery modules 12 can furthermore be attached, or bolted, to the battery housing 16, for example to the crossbars 28, and furthermore a cover 20 of the battery housing 16 can be placed on the battery housing lower part 14 and attached thereto. The battery housing 16 containing the battery modules 12 can furthermore optionally be mounted on an underbody protection element 48. This is especially advantageous when the battery arrangement is intended to be arranged in the underbody area of a motor vehicle, because such an underbody protection element 48 protects the battery modules 12 as well as the remaining components of this battery arrangement from rocks and other environmental influences. In addition, spacer elements, which are formed as trapezoidal plates 50 in this example, can be arranged between the underbody protection element 48 and the battery housing 14.

Figure 3:
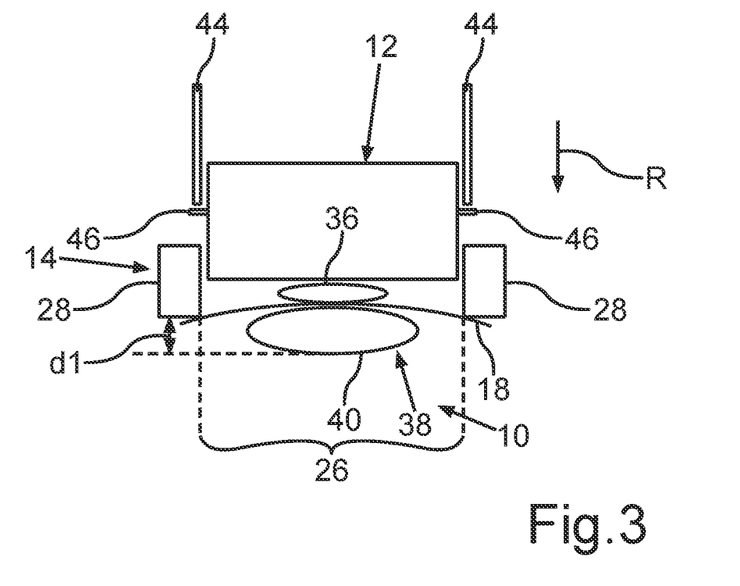
FIG. 3 a schematic illustration of a method for arranging a battery module in the battery housing in a first stage of the pressing according to a further exemplary embodiment of the invention.
Figure 4:
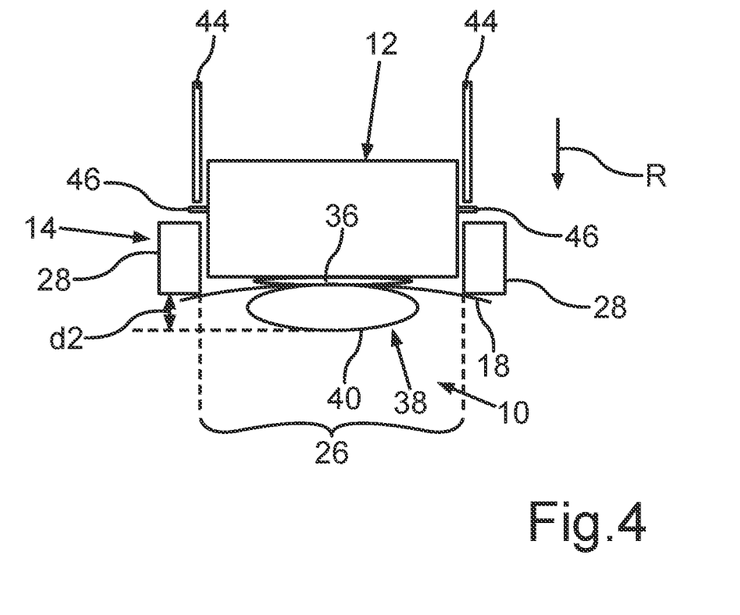
FIG. 4 a schematic illustration of a method for arranging a battery module in the battery housing in a second stage of the pressing according to the further exemplary embodiment of the invention.
Figure 5:
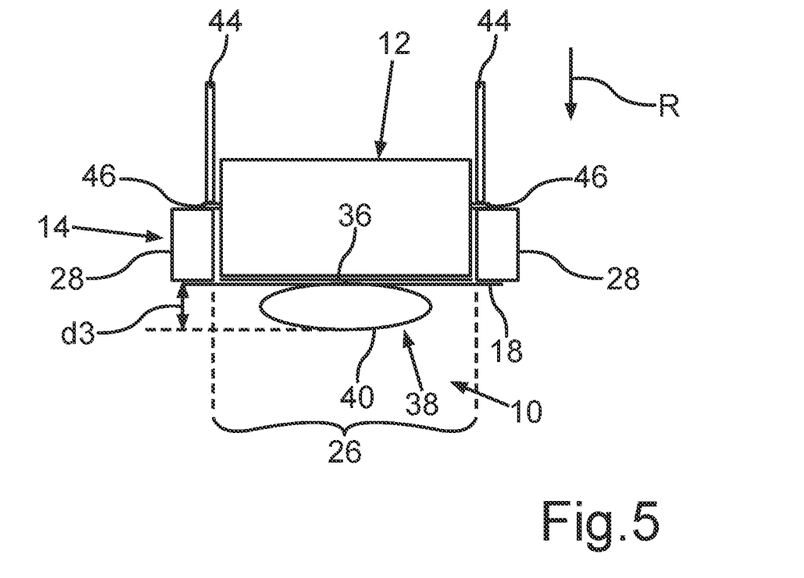
FIG. 5 a schematic illustration of a method for arranging a battery module in the battery housing in a third stage of the pressing according to a further exemplary embodiment of the invention.

FIG. 3, FIG. 4, and FIG. 5 show an illustration of a method for arranging a battery module 12 in a battery housing 16 and/or the lower part 14 thereof in various sequential stages of pressing according to a further exemplary embodiment of the invention. In this case as well, the arrangement of the battery module 12 in the battery housing lower part 14 takes place, in turn, by means of an arrangement device 10, which, in turn, comprises a counter-holder device 38 with a support element 40, as well as, in turn, the pressing tool 44 for pressing the battery module 12 onto the thermally conductive component 36 in the module placement area 26 of the cooling device 18. In this example, the counter-holder device 38 or at least a part thereof, for example the support element 40, is formed so as to move, contrary to the example from FIG. 1, particularly in and opposite the pressing direction R, which enables an especially advantageous distribution of the thermally conductive component 36 and an especially adapted pressure distribution completely over the module placement area 26. In this example as well, a predetermined quantity of thermally conductive component 36 may, in turn, initially be applied to the cooling device 18 in the particular module placement area 26, particularly in a central area, as shown in FIG. 3. In addition, the battery module 12 is placed onto the thermally conductive component 36 and pressed against the thermally conductive component 36 in the pressing direction R by means of the pressing tool 44. Before the pressing, a counter-force, that is opposite the pressing direction R, is exerted onto the central area of the module placement area 26 from below onto the cooling device 18 by means of the support element 40, such that the cooling device 18, which may be formed, in turn, as a cooling plate with optional cooling channels 22, curves opposite the pressing direction R, that is upward in this case. This curvature is shown in exaggerated form in this case. This curvature can also be increased only a few millimeters as compared to those areas of the cooling plate 18, which are mounted at the crossbars 28. For example, the central area of the cooling plate 18 may be increased by one to four millimeters, for example, between these crossbars 28. While the battery module 12 is pressed against the cooling plate 18 and the thermally conductive component 36 located thereon, the support element 40 is likewise moved in the pressing direction R, however such that a counter-force is further applied to the cooling device 18, opposite the pressing direction R, by means of this support element 40. Due to the movement of the support element 40, the curvature of the cooling plate 18 is reduced, as shown in FIG. 4, and the thermally conductive component 36 is distributed and pressed outward from the central area of the module placement area 26.

The movement of the support element 40 in the pressing direction R is shown in FIGS. 3 to 5 by means of the respective distances d1, d2, and d3. These represent the distances between a reference point of the support element 40, which is the lower side thereof in this example, and a reference point of the crossbars 28, wherein said distance d1, d2, d3 is also enlarged by means of the movement of the support element 40, i.e. distance d1 is less than distance d2, which is, in turn, less than distance d3.

In the end position, as shown in FIG. 5, the flanges 46 arranged on the module housing of the battery module 12 make contact with the crossbars 28, and the cooling device 18 is in the even, planar state. In this state, the thermally conductive component 36 is also evenly and homogeneously distributed over the entire module placement area 26.

Instead of a single support element 40, as shown in FIGS. 3 to 5, multiple support elements 40 may also, in turn, be provided per module placement area 26.

In addition, the counter-holder device 38 may also, for example, be at least partially deformable and/or elastic and/or may comprise a pneumatic and/or hydraulic system, for example an air bellows system or the like. In a similar manner however, the counter-holder device shown in FIG. 1 for supporting the cooling device 18 may also be provided here and likewise be formed to move.

As a whole, the examples show how an arrangement device and a method are provided, which enable an especially efficient formation of a battery arrangement and an especially efficient connection of battery modules to a cooling device. In particular, an especially slight and even layer thickness of the gap filler can hereby be set in an especially advantageous manner.

The invention claimed is:

1. A method for arranging at least one battery module in at least one part of a battery housing having a cooling device, comprising the following steps:
   providing the at least one part of the battery housing, which has an insertion opening for inserting the at least one battery module and the cooling device, the cooling device is arranged on a side of the part of the battery housing opposite the insertion opening, wherein the cooling device has a first side facing the insertion opening, a second side which is opposite the first side and which faces away from the insertion opening, and a predetermined module placement area;
   placing a thermally conductive component on the first side of the cooling device at least in the predetermined module placement area;
   inserting the at least one battery module in the module placement area; and
   pressing the battery module in a pressing direction (R) extending in the direction of the cooling device;
   wherein, prior to the pressing of the battery module, a counter-holder device is arranged on the second side of the cooling device so as to support the cooling device during the pressing of the at least one battery module in the predetermined module placement area, and
   wherein, following the pressing of the battery module, the counter-holder device is removed from the second side of the cooling device.

2. The method according to claim 1, wherein the cooling device is formed as a cooling plate with cooling channels, wherein the cooling channels are separated from one another, at least in areas, by intermediate areas of the cooling plate, through which none of the cooling channels extend.

3. The method according to claim 2, wherein the counter-holder device has at least one support element, which makes contact with the second side of the cooling device in order to provide support only in at least one of the intermediate areas of the cooling plate.

4. The method according to claim 1, wherein at least a part of the counter-holder device is formed so as to move in the pressing direction (R) and is moved in the pressing direction (R) during pressing of the at least one battery module.

5. The method according to claim 4, wherein a counter-force, in the module placement area, acting opposite the pressing direction (R) is applied to the cooling device by means of the counter-holder device before the pressing of the at least one battery module, such that the cooling device in the module placement area has a curvature opposite the pressing direction (R) before the pressing.

6. The method according to claim 5, wherein during pressing of the at least one battery module, the at least one part of the counter-holder device is moved in the pressing direction (R) until the cooling device is aligned in a planar fashion in the module placement area.

7. The method according to claim 1, wherein the part of the battery housing has restrictive elements extending in the pressing direction (R) and restricting the predetermined module placement area vertically with respect to the pressing direction (R), which elements are mounted on the cooling device.

8. The method according to claim 1, wherein the at least one battery module has a module housing, on which a flange is arranged on at least two opposite sides, wherein the pressing of the battery module takes place by means of a pressing tool, which exerts a press-on force onto the flange in the pressing direction (R).

9. The method according to claim 8, wherein the battery module is moved in the pressing direction (R) during pressing until a side of the flange facing the cooling device is resting on the restrictive elements.

10. An arrangement device for arranging at least one battery module in at least one part of a battery housing having a cooling device, wherein the arrangement device is designed to press the at least one battery module in a pressing direction (R), extending in the direction of the cooling device, onto a thermally conductive component, in a state arranged in a predetermined module placement area of the cooling device, wherein
   the arrangement device has a counter-holder device, which is designed to support one side of the cooling device during pressing of the at least one battery module in a predetermined module placement area and designed to be removed from the cooling device following pressing of the at least one battery module in the predetermined module placement area.

11. The method according to claim 1, wherein the cooling device constitutes a base of the at least one part of the battery housing.

12. The arrangement device according to claim 10, wherein the cooling device constitutes a base of the at least one part of the battery housing.

13. The method according to claim 4, wherein the part of the battery housing has re-strictive elements extending in the pressing direction (R) and restricting the predetermined module placement area vertically with respect to the pressing direction (R), which elements are mounted on the cooling device.

14. The method according to claim 5, wherein the part of the battery housing has re-strictive elements extending in the pressing direction (R) and restricting the predetermined module placement area vertically with respect to the pressing direction (R), which elements are mounted on the cooling device.

15. The method according to claim 6, wherein the part of the battery housing has re-strictive elements extending in the pressing direction (R) and restricting the predetermined module placement area vertically with respect to the pressing direction (R), which elements are mounted on the cooling device.

16. The method according to claim 2, wherein the at least one battery module has a module housing, on which a flange is arranged on at least two opposite sides, wherein the pressing of the battery module takes place by means of a pressing tool, which exerts a press-on force onto the flange in the pressing direction (R).

17. The method according to claim 3, wherein the at least one battery module has a module housing, on which a flange is arranged on at least two opposite sides, wherein the pressing of the battery module takes place by means of a pressing tool, which exerts a press-on force onto the flange in the pressing direction (R).

18. The method according to claim 4, wherein the at least one battery module has a module housing, on which a flange is arranged on at least two opposite sides, wherein the pressing of the battery module takes place by means of a pressing tool, which exerts a press-on force onto the flange in the pressing direction (R).

19. The method according to claim 5, wherein the at least one battery module has a module housing, on which a flange is arranged on at least two opposite sides, wherein the pressing of the battery module takes place by means of a pressing tool, which exerts a press-on force onto the flange in the pressing direction (R).

20. The method according to claim 6, wherein the at least one battery module has a module housing, on which a flange is arranged on at least two opposite sides, wherein the pressing of the battery module takes place by means of a pressing tool, which exerts a press-on force onto the flange in the pressing direction (R).

* * * * *